United States Patent [19]
Koiwai et al.

[11] Patent Number: 6,154,614
[45] Date of Patent: Nov. 28, 2000

[54] CAMERA OPTICAL SYSTEM HAVING NONPHOTOGRAPHIC LENS FORMED INTEGRALLY IN PHOTOGRAPHIC LENS SECTION

[75] Inventors: Tamotsu Koiwai, Akiruno; Mitsuhiro Sato, Hachioji, both of Japan

[73] Assignee: Olympus Optical Co., Ltd., Tokyo, Japan

[21] Appl. No.: 09/310,645

[22] Filed: May 12, 1999

[30]     Foreign Application Priority Data

May 14, 1998  [JP]  Japan .................................. 10-131962

[51] Int. Cl.⁷ ......................... G03B 13/06; G03B 13/36; G03B 7/99
[52] U.S. Cl. ......................... 396/106; 396/268; 396/382
[58] Field of Search ............................. 396/84, 106–110, 396/268, 382, 373, 267, 276, 385

[56]        References Cited

U.S. PATENT DOCUMENTS 3,180,218  4/1965  Durst ........................................ 396/276
4,394,077  7/1983  Yoshino et al. ........................ 396/106
4,682,886  7/1987  Toyama et al. ........................ 396/106
5,438,386  8/1995  Chao ......................................... 396/84

FOREIGN PATENT DOCUMENTS 5-11116    2/1993  Japan .
9-197237   7/1997  Japan .

*Primary Examiner*—W. B. Perkey
*Attorney, Agent, or Firm*—Frishauf, Holtz, Goodman, Langer & Chick, P.C.

[57]        ABSTRACT

A camera optical system has a photographic optical system and a finder optical system. The photographic optical system has a photographic lens section that receives an optical image from a subject to be photographed and forms an image on a film. The finder optical system has a nonphotographic lens provided integrally with the photographic lens section of the photographic optical system.

29 Claims, 3 Drawing Sheets

100 PHOTOGRAPHIC OPTICAL SYSTEM

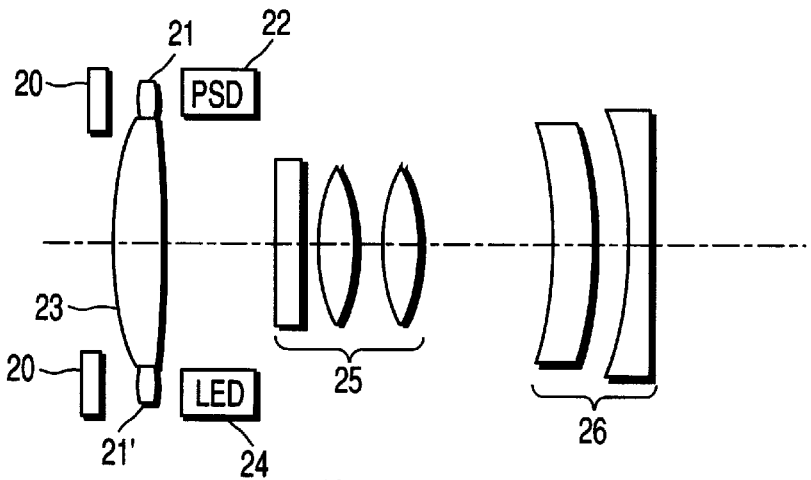
FIG. 4    101 PHOTOGRAPHIC OPTICAL SYSTEM
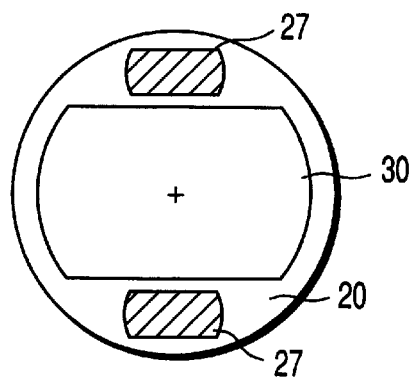
FIG. 5
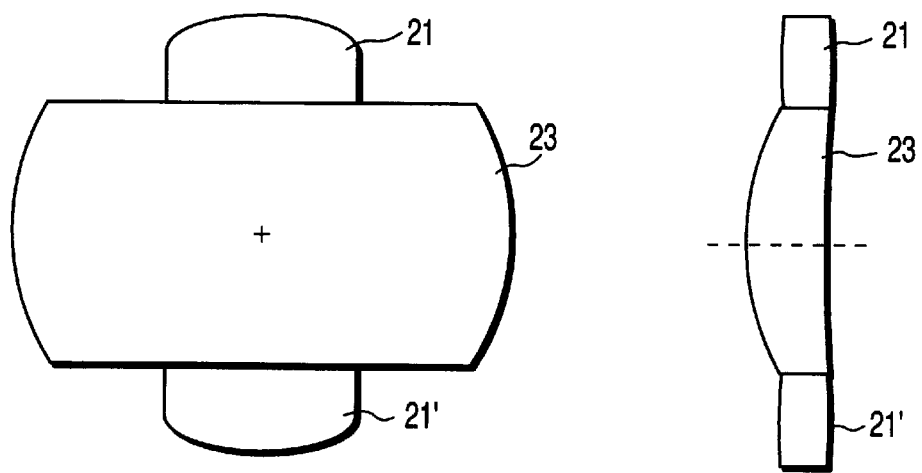
FIG. 6A    FIG. 6B

CAMERA OPTICAL SYSTEM HAVING NONPHOTOGRAPHIC LENS FORMED INTEGRALLY IN PHOTOGRAPHIC LENS SECTION

BACKGROUND OF THE INVENTION

This invention relates to a camera optical system, and more particularly to a camera optical system having a nonphotographic lens provided integrally in a photographic lens section for forming an image.

There have been compact cameras with part of the photographic lens cut away and another component provided on the cutaway part.

For example, Jpn. UM Appln. KOKAI Publication No. 5-11116 has disclosed a compact lens which has been realized by cutting the top and bottom of a first lens group in the optical system and incorporating a supplementary optical unit in the cutaway part.

Additionally, Jpn. Pat. Appln. KOKAI Publication No. 9-197237 has disclosed a compact photographic lens which has been realized by cutting the top and bottom of the photographic lens and providing a support member in the cutaway part.

The prior art publications, however, have not disclosed that part of the nonphotographic optical system, including the finder optical system, AE optical system, or AF optical system, is provided in the cutaway part of the photographic lens. For example, in Jpn. Pat. Appln. KOKAI publication No. 9-197237, since the finder optical system has been constructed independently in such a manner that it has branched from the middle of the lens group in the photographic optical system, this causes the problem of making the photographic optical system large.

It is, accordingly, an object of the present invention to provide a compact camera optical system with a nonphotographic lens formed integrally with a photographic lens section for forming an image.

BRIEF SUMMARY OF THE INVENTION

To achieve the foregoing object, a camera optical system according to a first aspect of the present invention, comprises: a camera optical system comprising: a photographic optical system having a photographic lens section that receives an optical image from an subject to be photographed and forms an image on a photographic medium; and a nonphotographic optical system having a nonphotographic lens provided integrally with the photographic lens section of the photographic optical system.

According to a second aspect of the present invention, there is provided a photographic optical system comprising a photographic lens for directing an optical image to a film, wherein the photographic lens is composed of plural optical members and part of a nonphotographic optical system is formed of the same optical members with portions of the plural optical members, unrelated to image formation on a film.

According to a third aspect of the present invention, there is provided a photographic optical system comprising a photographic lens for directing an optical image to a film, wherein the photographic lens is composed of plural optical members, including an integral optical member that causes a photographic luminous flux and a nonphotographic luminous flux to pass separately through respective areas divided in parallel with the longitudinal direction of the film.

According to a fourth aspect of the present invention, there is provided a camera photographic optical system including plural optical lenses comprising: a photographic luminous flux passing section that allows a luminous flux contributing to photography to pass through; and a nonphotographic luminous flux passing section that allows a luminous flux for sensing information on at least either observation or photography to pass through.

According to a fifth aspect of the present invention, there is provided a camera photographic optical system comprising: a photographic lens in which the top and bottom of a photographic luminous flux passing section for allowing a luminous flux contributing to photography to pass through are cut away to form cut faces and nonphotographic luminous flux passing sections for allowing a luminous flux for observation to pass through are provided integrally to the cut faces.

According to a sixth aspect of the present invention, there is provided a camera optical system comprising: a movable photographic optical system; and a nonphotographic optical system provided integrally with the photographic optical system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 shows the configuration of a second embodiment of the present invention applied to an AF optical system;

FIG. 5 shows the shape of a shading mask;

FIGS. 6A and 6B are a front view and a side view of the first lens group 23 and AF lens 21 of FIG. 4, respectively;

DETAILED DESCRIPTION OF THE INVENTION

Figure 1:
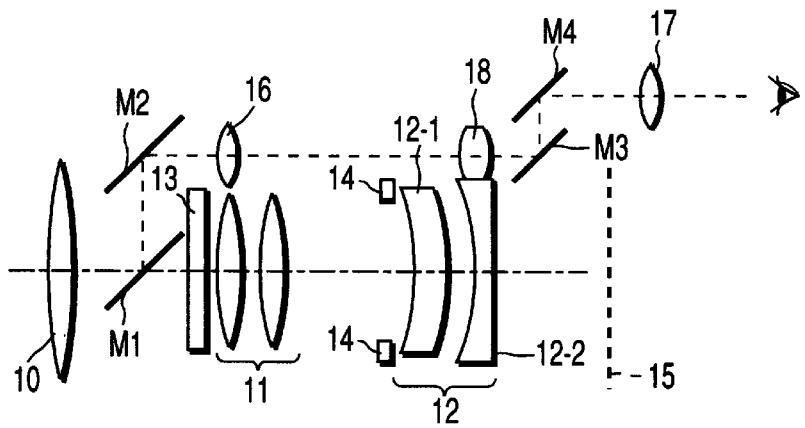
FIG. 1 shows the configuration of a first embodiment of the present invention applied to a finder optical system.

Hereinafter, referring to the accompanying drawings, embodiments of the present invention will be explained. FIG. 1 shows the configuration of a first embodiment of the present invention applied to a finder optical system. As shown in FIG. 1, a photographic optical system 100 comprises a first lens group 10, a mirror M1, a second lens group 11, and a third lens group 12 in the order in which the optical image from the subject to be photographed passes through. Numeral 15 indicates a film serving as a photographic medium. The third lens group 12 is composed of a front lens 12-1 and a rear lens 12-2. The top and bottom portions of each of the front lens and rear lens are cut away in such a manner that its photographic lens section for forming an image is left. Just in front of the front lens 12-1, there is provided a shading mask 14 for preventing stray light from arriving at the film 15. The stray light develops around the cutaway portions because the top and bottom portions of the front lens have been cut away.

The finder optical system is composed of mirrors M1, M2, a finder optical system 1 (16), a finder lens 18 serving as a nonphotographic lens, mirrors M3, M4, and a finder optical system 2 (17).

Figure 2A:
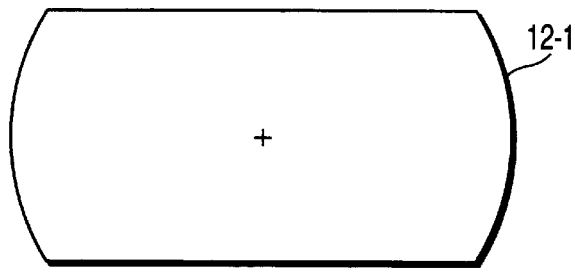
FIGS. 2A and 2B are a front view and a side view of the front lens 12-1 of FIG. 1, respectively.
Figure 2B:
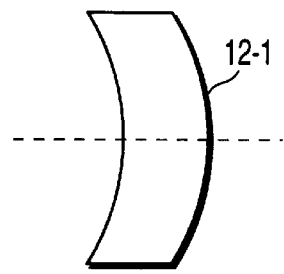
Figure 3A:
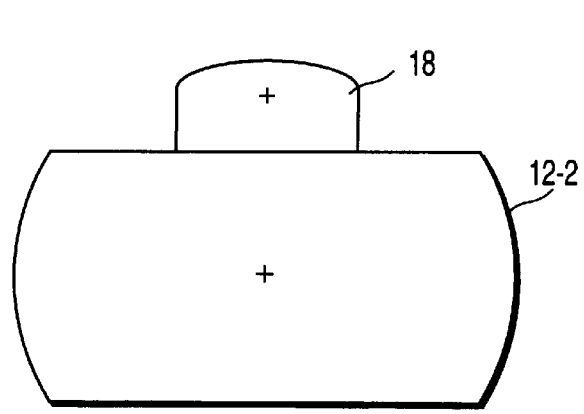
FIGS. 3A and 3B are a front view and a side view of the rear lens 12-2 and finder lens 18 of FIG. 1, respectively.
Figure 3B:
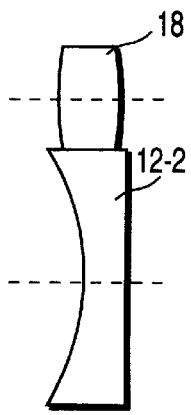

FIGS. 2A and 2B are a front view and a side view of the front lens 12-1 of the third lens group 12 shown in FIG. 1, respectively. FIGS. 3A and 3B are a front view and a side view of the rear lens 12-2 of the third lens group 12 and a finder lens 18 shown in FIG. 1, respectively.

These figures well illustrate how the top and bottom portions of each of the front lens 12-1 and rear lens 12-2 of the third lens group 12 are cut away. A finder lens 18, part of the finder optical system, is formed integrally with the upper cutaway portion of the rear lens 12-2. Suppose the rear lens 12-2 and finder lens 18 are integrally formed together in the manufacture.

FIG. 4 shows the configuration of a second embodiment of the present invention applied to an AF (autofocus) optical system. As shown in FIG. 4, a photographic optical system 101 comprises a first lens group 23, a second lens group 25, and a third lens group 26 in the order in which the optical image from the subject passes through. Numerals 21, 21' indicate AF lenses acting as nonphotographic lenses, 21 being a light-receiving lens and 21' being a projection lens. A PSD (position sensing element) is so provided that it corresponds to the light-receiving lens 21. An LED (light-emitting diode) 24 is so provided that it corresponds to the projection lens 21'.

As shown in FIG. 4, the top and bottom portions of the first lens group 23 are cut away in such a manner that the photographic lens section for forming an image is left. Just in front of the first lens group 23, there is provided a shading mask 20 for preventing stray light from arriving at the film. The stray light develops around the cutaway portions because the top and bottom portions of the first lens group have been cut away. As shown in FIG. 5, the shading mask 20 has an opening section 30 to allow the optical image from the subject to pass through. It further has infrared light-transmitting filters 27 provided on its top and bottom. The infrared light-transmitting filters permit only infrared rays to pass through.

FIGS. 6A and 6B are a front view and a side view of the first lens group 23 and AF lenses 21, 21' shown in FIG. 4, respectively. These figures well illustrate how the top and bottom portions of the first lens group 23 are cut away. The light-receiving lens 21 is formed integrally with the upper cutaway portion. The projection lens 21' is formed integrally with the lower cutaway portion. Suppose the light-receiving lens 21 and projection lens 21' are formed integrally with the first lens group 23 in the manufacture.

With the above configuration, the infrared rays of light from the LED 24 are projected on the subject (not shown) via the projection lens 21' and mask 20. The optical image from the subject passes through the mask 20 and light-receiving lens 21 and strikes the PSD 22. By sensing which part of the PSD 22 the infrared rays of light have struck, the distance to the subject can be measured.

Figure 7:
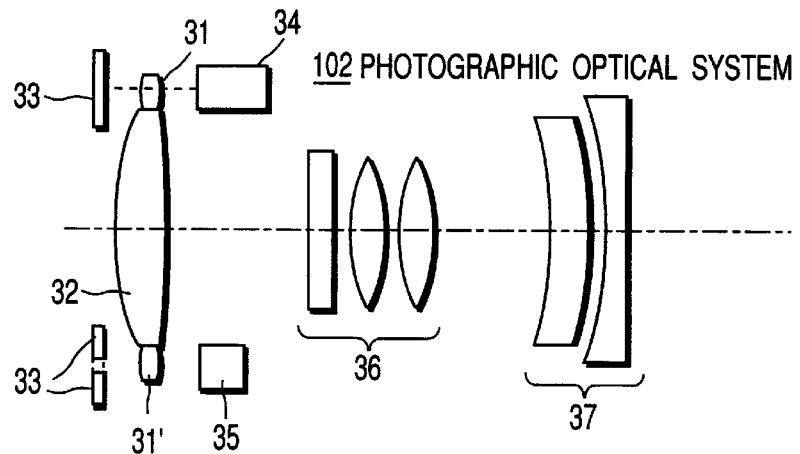
FIG. 7 shows the configuration of a third embodiment of the present invention applied to an AE optical system.

FIG. 7 shows the configuration of a third embodiment of the present invention applied to an AE (automatic exposure) optical system. As shown in FIG. 7, a photographic optical system 102 comprises a first lens group 32, a second lens group 36, and a third lens group 37 in the order in which the optical image from the subject passes through. Numerals 31, 31' indicate AE lenses acting as nonphotographic lenses. A PSD (or LED) 34 is so provided that it corresponds to the lens 31. A photometric sensor 35 is so provided that it corresponds to the lens 31'.

Figure 8:
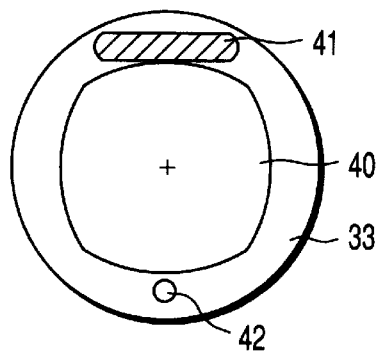
FIG. 8 shows the shape of a shading mask.

As shown in FIG. 7, the top and bottom portions of the first lens group 32 are cut away in such a manner that the photographic lens section for forming an image is left. Just in front of the first lens group 32, there is provided a shading mask 33 for preventing stray light from arriving at the film. The stray light develops around the cutaway portions because the top and bottom portions of the first lens group have been cut away. As shown in FIG. 8, the shading mask 33 has an opening section 40 to allow the optical image from the subject to pass through. It further has an infrared light-transmitting filter 41 provided at its top. The infrared light-transmitting filter allows only infrared rays of light to pass through. At its bottom, a small transparent window 42 is provided so as to prevent noise light excluding infrared light from entering.

Figure 9A:
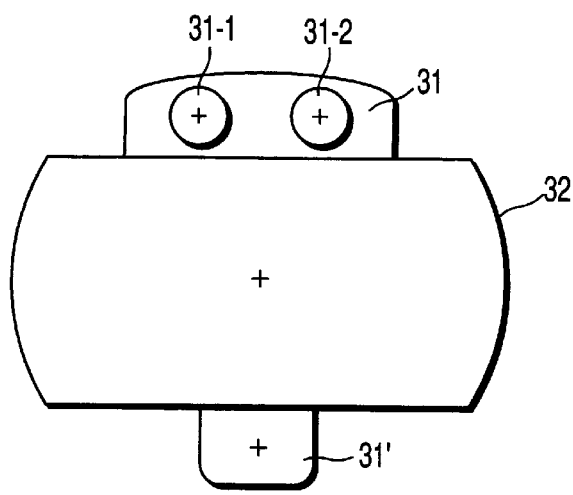
FIGS. 9A and 9B are a front view and a side view of the first lens group 23 and AE lens 21 of FIG. 7, respectively.
Figure 9B:
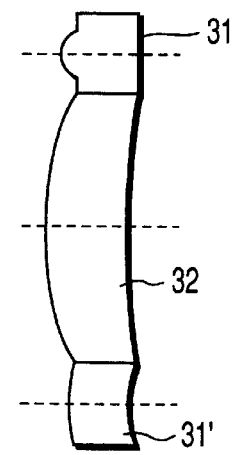

FIGS. 9A and 9B are a front view and a side view of the first lens group 32 and AE lenses 31, 31' shown in FIG. 7, respectively. These figures well illustrate how the top and bottom portions of the first lens group 32 are cut away. The AE lenses 31, 31' are formed integrally with the upper and lower cutaway portions, respectively. Suppose the AE lenses 31, 31' are formed integrally with the first lens group 32 in the manufacture. Reference symbol 31-1 indicates a projection lens for LED and 31-2 a light-receiving lens for PSD.

With the above configuration, for example, the infrared rays of light from the LED 34 are projected on the subject (not shown) via the AE lens 31 and shading mask 33. The optical image from the subject passes through the shading mask 33 and AE lens 31' and strikes the photometric sensor 35, which then measures the light.

The photographic lens integral with the nonphotographic lenses (including the finder lens 18, AF lenses 21, 21', and AE lenses 31, 31') can be realized by plastic molding lens or glass molding lens.

Furthermore, the configurations of the first to third embodiments may be combined suitably.

As described above, in the first to third embodiments, part of the nonphotographic optical system, including the finder optical system, AF optical system, or AE optical system, is formed integrally with the cutaway portion of the photographic lens, which makes no contribution to forming an image on a film. This realizes a compact optical system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera optical system comprising:
 a photographic optical system which receives an optical image from a subject to be photographed and which forms an image on a photographic medium;
 wherein said photographic optical system includes a lens in which a photographic lens section and a nonphotographic lens section are integrally formed, said nonphotographic lens section being provided in a range substantially contained in a maximum outside diameter of the photographic lens section and an outside effective range in which a photographic luminous flux passes the photographic lens section.

2. A camera optical system according to claim 1, wherein the photographic optical system comprises plural optical members, one of which forms the photographic lens section, and wherein the photographic lens section is closest to a photographic surface of the photographic medium among the plural optical members.

3. A camera optical system according to claim 1, wherein the photographic optical system comprises plural optical members, one of which forms the photographic lens section, and wherein the photographic lens section is farthest from a photographic surface of the photographic medium among the plural optical members.

4. A camera optical system according to claim 1, wherein the nonphotographic optical system comprises at least one of a finder optical system, an AF optical system, and an AE optical system.

5. A camera photographic optical system for directing an optical image to a film, comprising:
  an optical member in which a photographic lens section, which causes a photographic luminous flux to pass through a part of a photographic optical path, and a non-photographic lens section, which causes a non-photographic luminous flux to pass through another part of the photographic optical path, are integrally formed.

6. A camera photographic optical system according to claim 5, wherein the nonphotographic luminous flux comprises at least one of a finder luminous flux, an AF luminous flux, and an AE luminous flux.

7. A photographic optical system comprising:
  an optical member which directs an optical image to a film,
  wherein the optical member includes a section which is unrelated to image formation on the film and at which a part of a non-photographic optical system is integrally formed.

8. A camera photographic optical system according to claim 7, wherein the nonphotographic optical system comprises at least one of a finder.

9. A photographic optical system according to claim 7, wherein the optical member, among a plurality of optical members of the camera photographic optical system, is arranged at a position closest to a surface of the film.

10. A photographic optical system according to claim 7, wherein the optical member, among a plurality of optical members of the camera photographic optical system, is arranged at a position farthest from a surface of the film.

11. A photographic optical system for directing an optical image to a film, comprising:
  an optical element in which a photographic luminous flux area and a nonphotographic luminous flux area are integrally formed,
  wherein the photographic luminous flux area is an area through which a photographic luminous flux passes and contains an optical axis of the photographic optical system, and
  wherein the non-photographic luminous flux area is an area through which a non-photographic luminous flux passes, and is provided outside the photographic luminous flux area and at a position different from a position of the photographic luminous flux area in a longitudinal direction of a photographing area of the film.

12. A camera photographic optical system comprising:
  a photographic lens comprising an integrally formed luminous flux passing section and nonphotographic luminous flux passing section,
  wherein the luminous flux passing section allows a luminous flux contributing to photography to pass through, and the nonphotographic luminous flux passing section allows a luminous flux for sensing information on at least one of observation and photography to pass through.

13. A camera photographic optical system according to claim 12, wherein the photographic lens comprises a round photographic lens having a cut-away rim at which the photographic luminous flux passing section is provided.

14. A camera photographic optical system according to claim 12, wherein the photographic lens, among a plurality of optical lenses in the photographic optical system, is positioned one of closest to and farthest from a photographic surface of a photographic medium.

15. A camera photographic optical system according to claim 12, wherein the nonphotographic luminous flux passing section comprises a finder optical system that allows the luminous flux for sensing information on observation to pass through.

16. A camera photographic optical system according to claim 15, wherein the luminous flux entering the finder optical system comprises a luminous flux separated by the photographic optical system.

17. A camera photographic optical system according to claim 12, wherein the nonphotographic luminous flux passing section comprises one of an AF optical system and an AE optical system that allows the luminous flux for sensing information on photography to pass through.

18. A camera photographic optical system according to claim 17, wherein the nonphotographic luminous flux passing section comprises a shading member placed in front of a subject to be photographed.

19. A camera photographic optical system according to claim 18, wherein the shading member comprises an infrared light-transmitting filter.

20. A camera photographic optical system comprising:
  a photographic lens including a photographic luminous flux passing section that allows a luminous flux contributing to photography to pass through,
  wherein a top and a bottom portion of the photographic luminous flux passing section are cut away to form cut faces, and nonphotographic luminous flux passing sections that allow a luminous flux for sensing information on observation to pass through are provided integrally to the cut faces.

21. A camera photographic optical system comprising:
  a photographic lens including a photographic luminous flux passing section that allows a luminous flux contributing to photography to pass through,
  wherein a top and a bottom portion of the photographic luminous flux passing section are cut away to form cut faces, and nonphotographic luminous flux passing sections that allow a luminous flux for sensing information on photography to pass through are provided integrally to the cut faces.

22. A camera photographic optical system according to claim 21, wherein the nonphotographic luminous flux passing sections comprise a first nonphotographic luminous flux passing section and a second nonphotographic luminous flux passing section provided at the top and the bottom portion of the partially cut photographic luminous flux passing section, respectively, and projection means for projecting photometric light on a subject is placed behind one of the first and second nonphotographic luminous flux passing sections and light-receiving means for receiving reflected light from the subject is placed behind the other one of the first and second nonphotographic luminous flux passing sections.

23. A camera photographic optical system according to claim 22, wherein a mask member having an opening section that allows a photographic luminous flux to pass through and a filter section that selects infrared rays of light from the photographic luminous flux are provided in front of the photographic lens on a side of the subject.

24. A camera photographic optical system according to claim 21, wherein the nonphotographic luminous flux passing sections comprise a first nonphotographic luminous flux passing section and a second nonphotographic luminous flux passing section provided at the top and the bottom portion of the partially cut photographic luminous flux passing section, respectively and projection means for projecting photometric light on a subject and light-receiving means for receiving reflected light from the subject are placed behind one of the first and second nonphotographic luminous flux passing sections and a photometric device is placed behind the other one of the first and second nonphotographic luminous flux passing sections.

25. A camera photographic optical system according to claim 24, wherein a mask member having an opening section that allows a photographic luminous flux to pass through, an infrared light-transmitting filter provided corresponding to the light-receiving means, and a photometric hole provided corresponding to the projection means are provided in front of the photographic lens on a side of the subject.

26. A camera optical system comprising:

a photographic optical system that receives an optical image from a subject to be photographed and that forms an image on a photographic medium, and wherein the photographic optical section includes a lens having (i) a photographic lens section whose shape is obtained by cutting away a part of a rim of a round lens, and (ii) a non-photographic lens section integrally formed with the photographic lens section at the cut-away part of the rim of the round lens and outside an effective range in which a luminous flux passes through the photographic lens section.

27. A camera optical system according to claim 26, wherein the part of the rim of the round lens which is cut away and at which the photographic lens section is integrally formed is substantially parallel to a longitudinal direction of the photographic medium.

28. A camera optical system according to claim 26, further comprising:

a shading member, provided closer to the subject than the lens, that cuts off a luminous flux incident on an area around the cut-away section.

29. A camera optical system according to claim 28, wherein the non-photographic lens section forms a part of an AF optical system, and wherein the shading member comprises an infrared light-transmitting filter.

* * * * *